Figure 1:
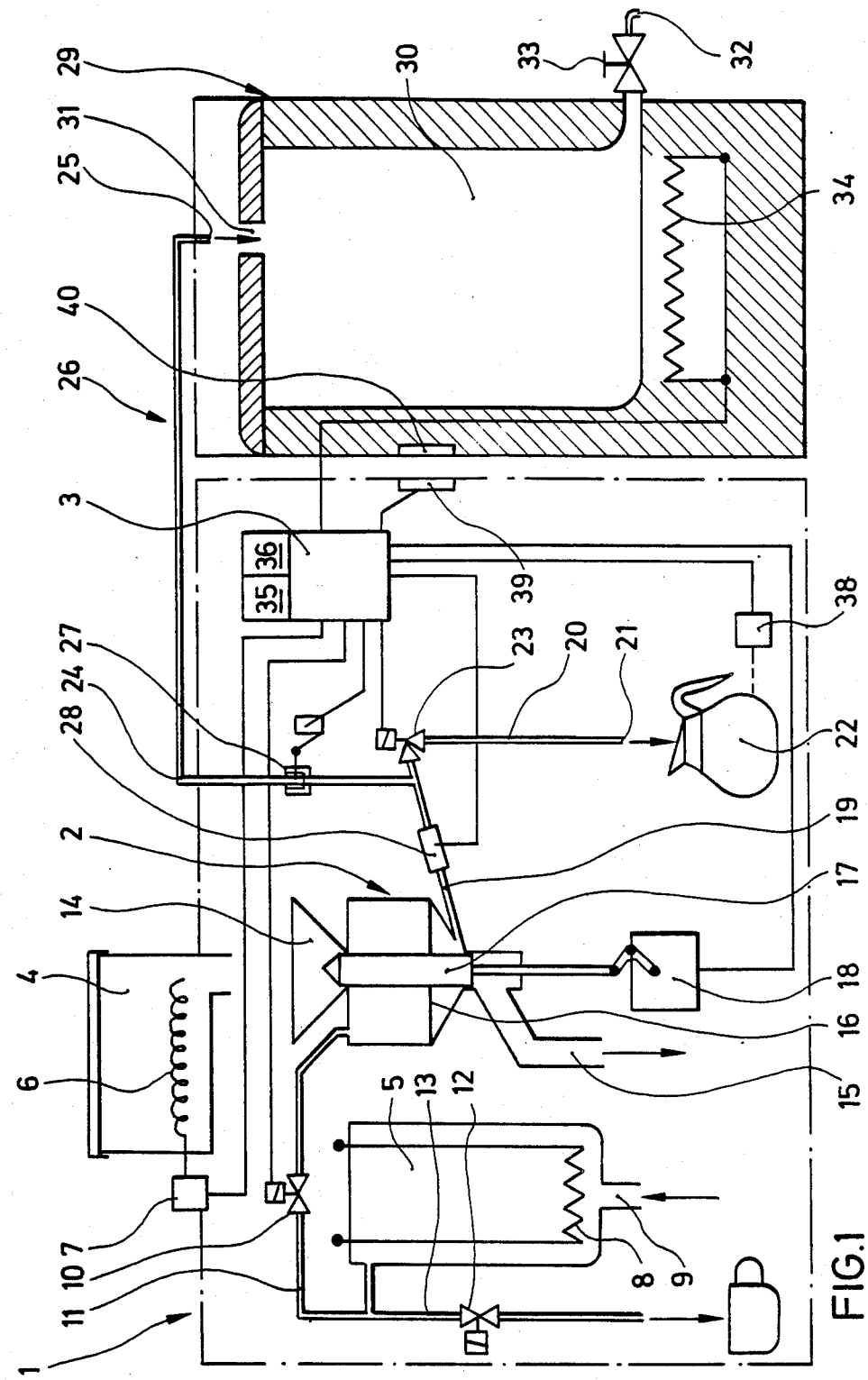

United States Patent [19]

Siegfried

[11] Patent Number: 4,703,686
[45] Date of Patent: Nov. 3, 1987

[54] COFFEE PERCOLATOR

[75] Inventor: Anderl Siegfried, Amstetten, Fed. Rep. of Germany

[73] Assignee: Wuerttembergische Metallwarenfabrik AG, Fed. Rep. of Germany

[21] Appl. No.: 828,494

[22] Filed: Feb. 11, 1986

[30] Foreign Application Priority Data

Feb. 26, 1985 [DE] Fed. Rep. of Germany ....... 3506781

[51] Int. Cl.$^4$ .............................................. A47J 31/00
[52] U.S. Cl. .......................................... 99/279; 99/300
[58] Field of Search ................. 99/279, 280, 281, 282, 99/283, 294, 291, 290, 299, 300, 316; 426/433

[56] References Cited

U.S. PATENT DOCUMENTS

| 2,890,643 | 6/1959 | King .................................. 99/291 |
| 4,309,939 | 1/1982 | Stover ................................ 99/280 |
| 4,621,571 | 11/1986 | Roberts ............................. 99/280 |

FOREIGN PATENT DOCUMENTS 3346280 5/1985 Fed. Rep. of Germany ........ 99/280

Primary Examiner—Robert W. Jenkins
Attorney, Agent, or Firm—Arnold, White & Durkee

[57] ABSTRACT

Described is a coffee percolator for dispensing individual charges of freshly brewed coffee, which may also be employed, however, for satisfying a temporarily occurring increased demand. To this purpose the percolator is provided with a second outlet for dispensing the coffee into a storage container. In a preferred embodiment, two separate switching means are provided for actuation by the user for dispensing the coffee directly into a serving receptacle or into the storage container. This permits charges of different size to be preselected, so that a greater amount of coffee can be brewed for filling the storage container than would be required for filling a serving receptacle. The storage container is portable and provided with its own outlet, so that it can readily be carried to the site of use.

14 Claims, 2 Drawing Figures

COFFEE PERCOLATOR

The present invention relates to a coffee percolator of the type defined in the generic clause of claim 1.

A coffee percolator of this type is known froma prospectus of the EGRO Corporation. In this percolator the first outlet serves for dispensing freshly brewed coffee into a small, shallow receptacle such as a cup. To this purpose this outlet is located at a relatively low position above a support surface for the receptacle so as to avoid splashing the coffee about. The second outlet of the known percolator also serves for dispensing freshly brewed coffee into a serving receptacle; it is only located at a higher position than the first outlet to enable a bigger serving receptacle such as a coffee-pot to be placed between the support surface and the second outlet. This percolator is thus designed for continuously covering a fairly constant demand for freshly brewed coffee. The efficiency of this percolator is somewhat restricted, however, as a satisfactory extraction requires the coffee meal to be in contact with scalding water for a certain minimum time, and the finished beverage cannot be dispensed faster than it percolated through the coffee meal. A certain period of time is in addition required between two brewing cycles for removing the residues of the previous coffee meal charge, for cleaning the brewing section and for charging a metered amount of fresh coffee meal. As a result thereof, the known percolator is unable to meet a suddenly occurring increased demand.

A similar coffee percolator likewise designed for dispensing freshly brewed coffee, although in somewhat greater quantities, is described in DE-OS No. 21 12 609. This percolator has only one outlet, however, so that not even the adaptation to serving receptacles of different sizes is possible. Known from DE-OS No. 30 45 244 moreover is a coffee percolator of a special construction permitting the interval between successive brewing cycles to be reduced. But also in this case there remains the problem that the through-put capacity is too low for permitting a suddenly occurring increased demand to be satisfied, for instance for catering to a travel group. For these reasons, the single-charge coffee percolators are relatively rarely to be found in practical use, although the dispensed coffee is of better quality. The trade is thus rather inclined to resort to so-called batch percolators.

Such a batch percolator is known for instance from Swiss Pat. No. 608 363. This coffee percolator is designed for brewing a bigger charge or batch of coffee equalling a plurality of individual helpings. This batch is directed into one or several batch containers and retained therein until the coffee is to be dispensed. In a coffee percolator of this type it has already been tried to reduce the dwell time of the coffee in a batch container by providing three batch containers each having a reduced volume and adapted to be filled one after the other with a single brewing charge each, and to be subsequently emptied in the same sequence in which they have been filled. Even in this case, however, the dispensing of freshly brewed coffee is not either possible in the case of reduced demand, because the previously brewed coffee supply has always to be dispensed before the last-filled container can be tapped.

It is therefore an object of the present invention to improve a coffee percolator of the type defined in the introduction in such a manner that it is capable of being universally employed in cases of varying demand.

The percolator according to the invention is not only able to cover a fairly constant demand for freshly brewed coffee; it is rather also capable of covering an intermittently occurring increased demand by permitting a greater supply of coffee to be providently brewed and to be directed through the second outlet into a storage container for temporary storage as in a known batch percolator. The storage container is provided with its own dispensing means permitting coffee to be dispensed therefrom whenever the demand cannot be covered by freshly brewed coffee over a certain period. The percolator according to the invention may thus be selectively operated as a single charge percolator, as a batch percolator or in both of these modes simultaneously. This permits the percolator to be adapted to cases of varying demand with a high degree of flexibility.

A particularly simple embodiment requires only a single actuation to switch over from the first outlet to the second outlet and to initiate the brewing of coffee to be temporarily stored.

Another embodiment offers the advantage that the initiation of the brewing cycle for filling the storage container automatically results in the brewing of a bigger charge, so that the storage container can be filled more rapidly and the percolator is thus available for the single-charge brewing operation after a correspondingly short time.

Other embodiment result in a simple construction of the percolator employing a simple two-way valve as the valve means.

The construction of the storage container as a portable unit permits the temporarily stored coffee to be transferred from the installation site of the percolator to any other location, whereby the range of use of the percolator is greatly enlarged.

Another characteristic of the invention results in the advantage that the repeating of the brewing cycle without altering the quantity of coffeemeal to be metered ensures rapid filling of the storage container.

Another embodiment is directed to an improvement of the storage container enabling the coffee to be kept warm over an extended period.

Figure 2:
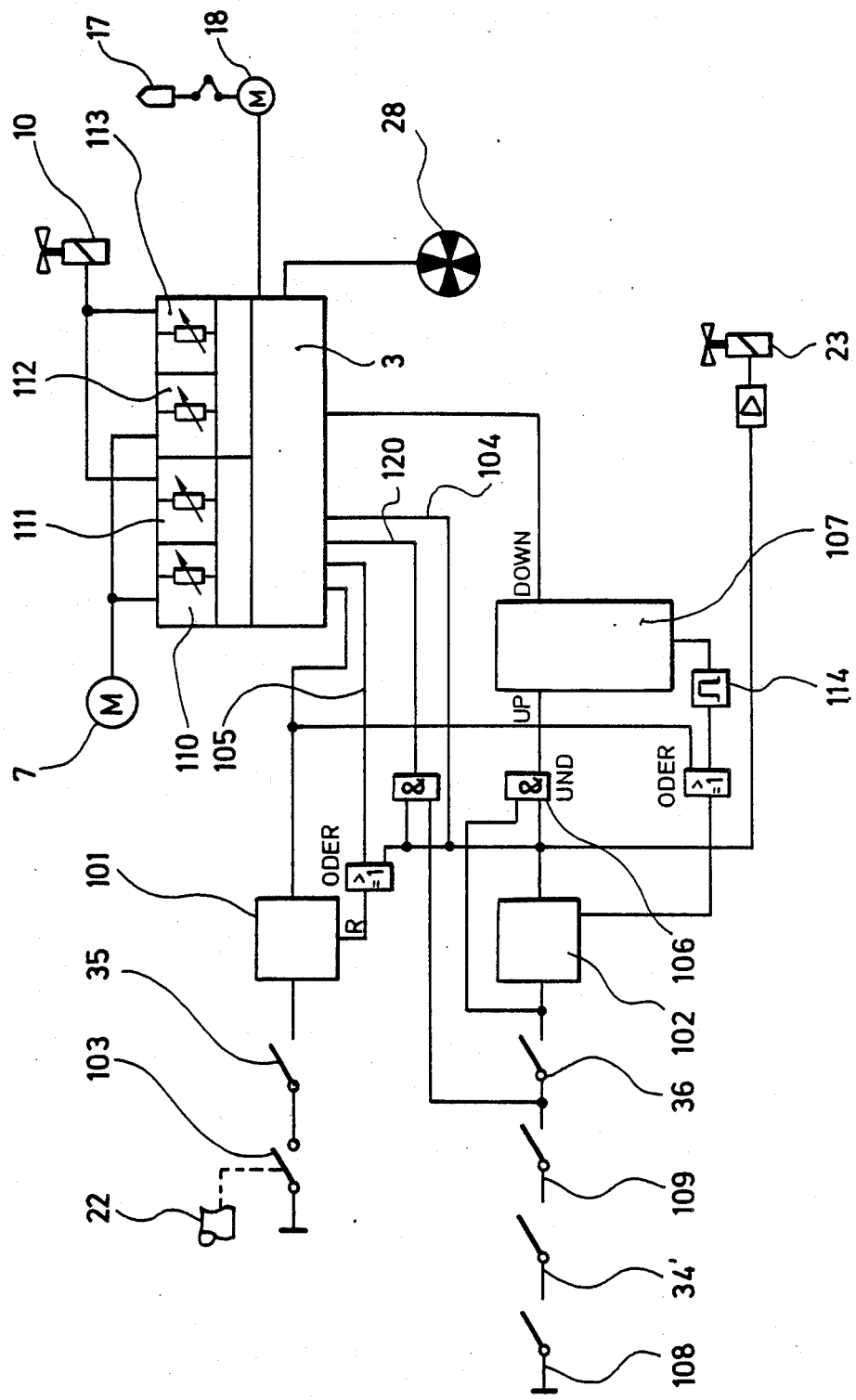

An embodiment of the invention shall now be described in detail by way of example with reference to the accompanying drawings, wherein:

FIG. 1 shows a diagrammatical illustration of the coffee percolator according to the invention, and FIG. 2 shows a circuit diagram.

Shown in FIG. 1 is a coffee percolator 1 having a brewing section 2 the operation of which is controlled by a control circuit 3. The particular constructon of the brewing section 2, the preparation and supply of hot water, the supply of coffee meal, the removal of the exhausted coffee grounds and the cleaning of the brewing section are not critical. Preference is given, however, to the coffee percolator 1 shown in the drawing, which is provided with an integrated coffee meal container 4 and a water heating container 5. Provided at a lower portion of coffee meal container 4 is a metering screw conveyor 6 adapted to be rotated by a motor 7 under the control of control circuit 3 in such a manner that a determined, previously selected quantity of coffee meal can be supplied to brewing section 2.

Water heating container 5 is provided with a heater 8 also adapted to be activated via control circuit 3. A water supply pipe 9 opening into a lower portion of water heating container 5 is connected to an external mains supply. A connecting pipe 11 connecting an upper portion of water heating container 5 to brewing section 2 includes a valve 10 adapted to be actuated by control circuit 3. Also extending from the upper portion of water heating container 5 as a branch of connecting pipe 11 is an outlet pipe 13 including a valve 12. Outlet pipe 13 serves for directly dispensing hot water as for making tea. Valve 12 may be actuated via control circuit 3 or via a separate circuit.

Brewing section 2 has a filling hopper 14 at its upper end, and a preferably likewise funnel-shaped lower end provided with a discharge tube 15 for discharging the exhausted coffee grounds therethrough. Disposed above the funnel-shaped lower end portion of brewing section 2 is a percolating sieve 16. Extending over the full height of brewing section 2 is a centrally mounted control piston 17. Control piston 17 extends through an opening of percolator sieve 16 and is mounted for longitudinal displacement within the brewing section. The longitudinal displacement of control piston 17 is accomplished by a motor 18 under the control of control circuit 3. The dimensions of control piston 17 are selected so that it is operable to selectively open a passage between filling hopper 14 and brewing section 2 or a passage between brewing section 2 and discharge tube 15 or to simultaneously close both passages.

From brewing section 2 an outlet pipe 19 extends to a connecting pipe 20 extending outwards of the housing of coffee percolator 1 to a first outlet 21. First outlet 21 is disposed at a position permitting a serving receptacle, in the present case a coffee-pot 22, to be placed therebelow. Provided in connecting pipe 20 is a control valve 23 adapted to be operated via control circuit 3. First outlet 21 is located below, and control valve 23 is disposed above the point whereat outlet pipe 19 is connected to brewing section 2.

Outlet pipe 19 is also connected to a second connecting pipe 24 extending to a second outlet 25 exterior of coffee percolator 1. Second outlet 25 is carried by a pivot arm 26 only diagrammatically indicated in the drawing and releasably connected to the coffee percolator by a plug-in connection 27. Plug-in connection 27 is provided with electric contacts acting on control circuit 3 in such a manner that the connection to first outlet 21 via control valve 23 cannot be closed when pivot arm 26 is not in position. Pivot arm 26 is rotatable about an axis by an angle of at least 250°, so that it can be stored against the housing of the percolator. Included in outlet pipe 19 is a flow meter 28 cooperating with control circuit 3.

Control valve 23 is a two-way valve for opening a respective passage towards first and second outlet 21 or 25, respectively, in the deenergized state. Control valve 23 is disposed downstream of the connection of connecting pipe 24 to outlet pipe 19 slightly above the level of flow meter 28 at the highest point of connecting pipe 20. The interior cross-sectional area of connecting pipe 20 is equal to or greater than that of connecting pipe 24 and outlet pipe 19, so that after opening control valve 23 there can be no back pressure which might interfere with the dispensing of coffee through connecting pipe 24. When flow meter 28 indicates that the previously selected charge of coffee has passed therethrough, valve 10 is closed to stop the admission of hot water, and control piston 17 is displaced for admitting air to the brewing section from below, so that the pressure therein is abruptly relieved and no further coffee is conveyed under pressure through flow meter 28. As a result, coffee still contained in outlet pipe 19 is permitted to flow off through discharge tube 15. The coffee contained in connecting pipe 20 is drained into receptacle 22 due to the venting effect via connecting pipe 24.

Second outlet 25 is disposed above the level whereat outlet pipe 19 is connected to brewing section 2 at a level permitting a portable storage container 29 to be placed therebelow and also permitting any coffee remaining in piper 24 and 19 after container 29 has been filled to be drained through discharge tube 15. Storage container 29 contains a storage space 30 for the percolated coffee. The upper end of storage space 30 is formed with a preferably closable filling opening 31 permitting the container to be filled with coffee from second outlet 25. Disposed at the lowest point of storage space 30 is an outlet 32 provided with a manually or electrically operable dispensing valve 33. Storage space 30 is surrounded by insulated walls of container 29 for minimizing heat losses of the coffee. Also provided within storage container 29 is an electric heater 34 for keeping the coffee in storage space 30 warm. Heater 34 may be connected to the electric circuit of coffee percolator by a plug connection (not shown). The plug connection may again be provided with contacts cooperating with control circuit 3 in a manner to prevent control valve 23 from closing the passage toward first outlet 21 when the plug connection is separated.

The connecting pipe 24 leading to second outlet 25 opens vertically upwards at the top of coffee percolator 1 for receiving plug-in connector 27 therein with pivot arm 26 extending substantially at right angles thereto. This permits storage container 29 to be substantially of the same height as coffee percolator 1, so that storage space 30 may have a relatively great volume, and the outer design of storage container 29 may be complementary to that of the coffee percolator.

Disposed at an outer portion of the housing of coffee percolator 1 opposite storage container 29 is a sensor 39 for detecting the presence of storage container 29 at its proper location. Sensor 39 may for instance be activated by a metal plate or a magnet 40 mounted in a sidewall of storage container 29 is placed in its proper position relative to coffee percolator 1. Control valve 23 can only be closed when magnet 40 is properly positioned in proximity to sensor 39.

Mounted at an exterior location of the housing of coffee percolator 1 are a first and a second swiching means operable by the user, specifically, a first and a second key 35 and 36, of which first key 35 is operable for making a single helping of coffee. Second key 36 is connected to a not shown repeat circuit and serves for initiating the brewing cycle for filling storage container 29. At the exterior of the housing of coffee percolator 1 there may also be provided for instance a display for indicating the amount of coffee measured by flow meter 28, a display and selector means for selecting the amount of coffee to be supplied to storage container 29 by the operation of the repeat circuit, and a warning indication or an emergency stop switch for stopping operation of the percolator in case of malfunction.

The operation of the coffee percolator according to the invention shall now be explained with reference to FIG. 2.

On installaton of coffee percolator 1 the amounts of coffee to be made by operation of keys 35 and 36 are preselected by properly adjusting respective circuit components, in particular potentiometers 110, 111, 112 and 113. The amount of coffee to be dispensed from first outlet 21 may thus be adjusted to 1.7 liters, i.e. to the filling volume of receptacle 22. The amount of coffee to be dispensed from second outlet 25 into storage container 29 may be adjusted to four litres for instance.

Operation of first key 35 by the user initiates the brewing of the first charge of for instance 1.7 liters. As first key 35 is depressed, a first flip-flop 101 is set, provided that a second flip-flop 102 associated with second key 36 has not been set, and a proximity switch 103 of a sensing means 38 signals the presence of receptacle 22 in place. Motor 7 starts and is switched off when the number of revolutions of screw conveyor 6 corresponds to the amount of coffee meal for one charge of coffee. The amount of coffee meal, i.e. the number of revolutions of screw conveyor 6 or the period of energization of motor 7 is adjusted by a potentiometer 110. Hot water valve 10 is opened for admitting hot water to brewing section 2. Coffee is percolated until the number of pulses emitted by flow meter 28 corresponds to the number of pulses selected by a second potentiometer 111. The percolated coffee flows under the effect of gravity through open control valve 23, outlet pipe 19 and connecting pipe 20 to be dispensed from first outlet 21 into receptacle 22. After the preselected amount of coffee has percolated, valve 10 is closed, and at the same time motor 18 is energized for opening the lower discharge passage of brewing section 2, so that the coffee grounds are flushed out through discharge tube 15. The control circuit 3 of the percolator is reset to the zero position by a reset pulse 105 applied to first flip-flop 101.

A single actuation of second key 36 causes the associated flip-flop 102 to be set, provided that pivot arm 26 is connected to connection pipe 24, which is indicated by the closing of a switch 108, and/or heater 34 is connected to the circuit of the percolator, which is indicated by the closing of a switch 34', and/or sensor 39 senses the presence of magnet 40 of storage container 29, which is indicated by the closing of a proximity switch 109. Setting of flip-flop 102 initiates the brewing cycle for the four litre charge via a conductor 104 and control circuit 3. Motor 7 starts rotating and is switched off when the number of revolutions of screw conveyor 6 corresponds to the amount of coffee meal previously selected by setting a potentiometer 112. Control valve 23 is closed, so that the percolated coffee is forced through outlet pipe 19 connecting pipe 24, pivot arm 26 and second outlet 25 into the storage space 30 of container 29 by the pressure prevailing within brewing section 2. Valve 10 of the hot water supply remains open until the number of pulses emitted by flow meter 28 corresponds to the number of pulses to which a potentiometer 113 has been previously adjusted, whereupon valve 10 is closed. The remaining procedure is the same as in the case of brewing a single helping, the reset pulse for resetting second flip-flop 102 being generated by a mono-flop 114.

When key 36 is actuated several times in succession, the resultant signals are applied to an AND gate 106 for advancing a counter 107 by one step for each key actuation. The final number of steps is stored (in liters or charges) and displayed by a display unit associated with key 36. The brewing and dispensing of the coffee then proceeds in the manner described above. When in this case brewing section 2 is reset to the zero condition, no reset pulse is applied to flip-flop 102, instead of which counter 107 is decreased by one step. When thus more than one brewing charge has been preselected, brewing section 2 automatically continues to operate through complete brewing cycles until the number of cycles corresponds to the preselected number of pulses, whereupon second flip-flop 102 is reset.

If during the described brewing cycles one of the switches 103, 108, 34, 109 is opened, the brewing operation is interrupted via conductor 120 by closing valve 10 in the hot water supply pipe.

After storage space 30 of portable container 29 has been filled with the selected amount of coffee, the electric connection to coffee percolator 1 may be released, and the storage container may be transferred to the site of use, whereat individual helpings of coffee may be dispensed from outlet 32. During this time, coffee percolator 1 may be operated for diepensing individual charges of coffee from first outlet 21, or a second storage container may be positioned and filled.

The invention is not restricted to the embodiment described and illustrated by way of example. The brewing section may thus be of a different known construction. The hot water outlet 13 for making tea may be eliminated. The flow meter in the outlet pipe is employed for measuring the amount flowing therethrough and for interrupting the brewing operation as soon as the preselected amount of coffee has been so measured. A flow meter may also provided in each of the connecting pipes leading to the first and second outlets. It is preferred, however, to employ only a single flow meter disposed upstream of the control valve, as shown in the drawings. In another modification, electrodes within the brewing section may be employed for measuring the quantity of coffee brewed and for controlling the brewing cycle. The flow meter may also be disposed between the hot water supply valve 10 and the brewing section 2, or other known means may be employed for measuring the amount of coffee brewed and for controlling the brewing operation.

The valve controlling the flow towards first outlet 21 may be replaced by a three-way valve at the junction of the outlet pipe and the connection pipes leading to the first and second outlets. The second outlet may also be arranged similarly to the first outlet, i.e. without the employ of a pivot arm, as long as it is ensured that a storage container of sufficient size can be filled. The safety features in the plug connections between the pivot arm and the heater on the one hand and the coffee percolator on the other hand may be provided together or alternatively, or may even be eliminated. It is also possible to provide only a single switching means and to control the selection of the outlet to be supplied by means of one or several of the described plug connections, so that for instance the coffee is automatically supplied to the storage container when the latter is connected to the electric circuit of the coffee percolator. The charges of percolated coffee to be dispensed via the first or second outlet may be equal or greater or smaller than the amounts indicated in litres above. The first switching means may likewise be operable to actuate a repeat circuit. It is also within the scope of the invention to eliminate the second switching key altogether and to modify the control circuit 3 in such a manner that a single actuation of first key 35 initiates a brewing cycle for a single charge which is dispensed via deenergized control valve 23 and first outlet 21.

If in this case switching key 35 is actuated twice or several times, control valve 23 is closed. The thus selected number of brewing cycles is displayed on or adjacent to switching key 35, the percolated coffee being dispensed via connecting pipe 26 and outlet 25 into storage space 30 of storage container 29.

I claim:

1. A coffee percolator having a brewing section, a first outlet for dispensing freshly brewed coffee directly into a serving receptacle, a second outlet cooperating with a storage container having its own dispensing means for dispensing temporarily stored coffee, valve means operable to selectively connect said first or second outlet to said brewing section, and a control circuit including a first switching means operable by the user for initiating a brewing and dispensing cycle for a metered charge of coffee.

2. A coffee percolator according to claim 1, characterized by comprising second switching means operable to actuate said valve means for activating said second outlet to simultaneously initiate a brewing cycle.

3. A coffee percolator according to claim 2, characterized in that the metered charge dispensed on actuation of said second switching means is greater than the metered charge to be dispensed on actuation of said first switching means.

4. A coffee percolator according to claim 2, characterized in that a repeater circuit is connected to said second switching means for activating said second outlet.

5. A coffee percolator according to claim 1, further comprising a discharge pipe having its lower end connected to said brewing section, and a connection pipe having its lower end positioned to discharge to said first outlet, the upper ends of said discharge pipe and said connection pipe being connected by said valve means at the highest point between said upper ends.

6. A coffee percolator according to claim 1, characterized in that said second outlet is disposed above the level of said first outlet and above said valve means.

7. A coffee percolator according to claim 1, characterized in that said storage container is designed as a portable unit.

8. A coffee percolator according to claim 7, characterized in that said percolator comprises a sensor cooperating with a metal plate on said storage container and connected via a flip-flop to a second switching means, allowing the supply of coffee to said second outlet only when said storage container is in place below said second outlet.

9. A coffee percolator according to claim 1, further comprising a pivot arm extending across the top of the percolator, said second outlet being disposed at the end of said pivot arm.

10. A coffee percolator according to claim 9, characterized in that said pivot arm is removably mounted.

11. A coffee percolator according to claim 9, characterized in that said control circuit is connected to said pivot arm in such a manner that the flow of coffee is prevented from being directed towards said second outlet when said pivot arm is removed.

12. A coffee percolator according to claim 1, characterized in that said storage container includes an electric heater for the coffee.

13. A coffee percolator according to claim 1, characterized in that a control element is provided in proximity to said first outlet, said control element comprising a proximity switch and a first flip-flop, allowing coffee to be supplied to said first outlet only when said proximity switch signals the presence of said serving receptacle below said first outlet.

14. A coffee percolator comprising:
a brewing section;
a storage container including a valved outlet for dispensing coffee contained within the storage container;
a first outlet for dispensing freshly brewed coffee directly into a serving receptacle;
a second outlet to dispense coffee into said storage container; and
valve means connected to said brewing section and said first and second outlets operable to dispense coffee from said brewing section selectively into said first outlet or said second outlet.

* * * * *